Sept. 5, 1944.  S. E. HEYMANN ET AL  2,357,404
AIRCRAFT HEATING SYSTEM
Filed Dec. 19, 1941
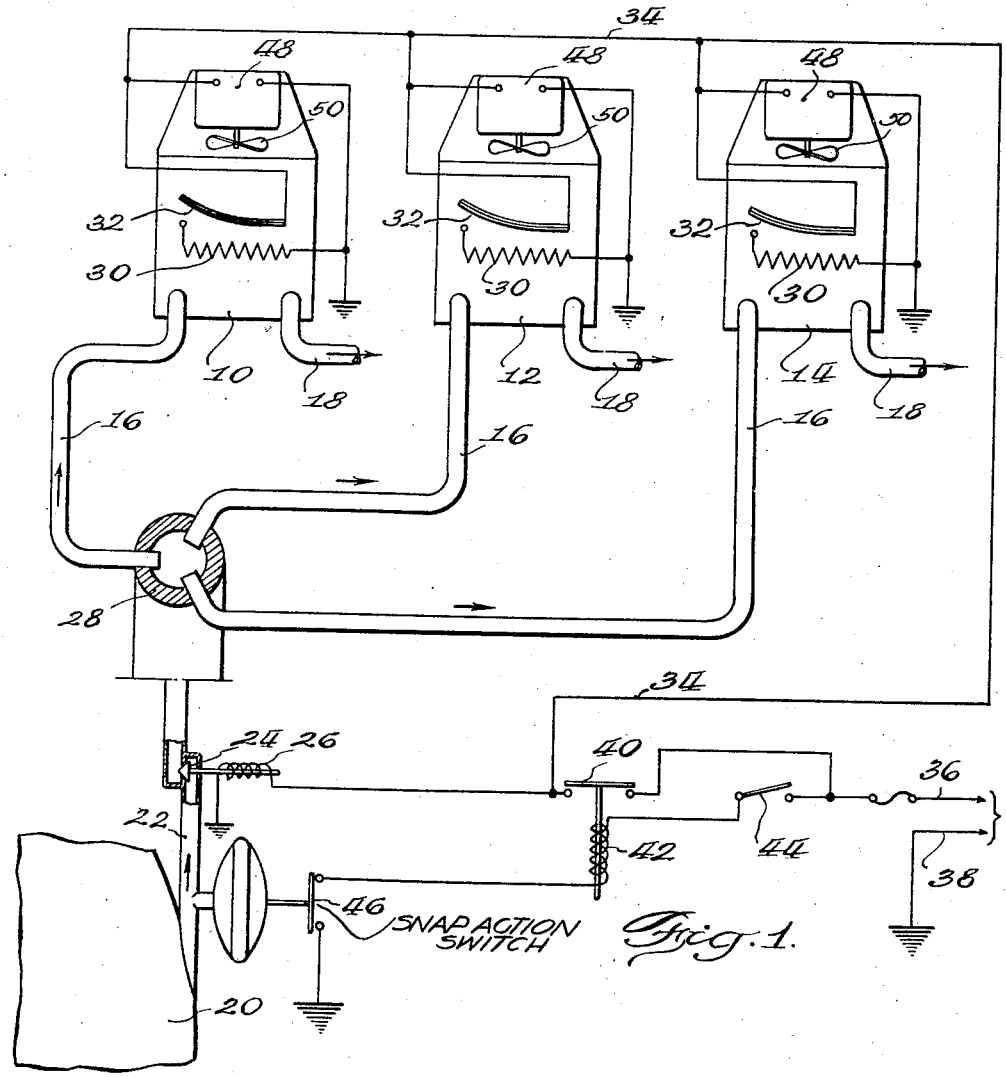
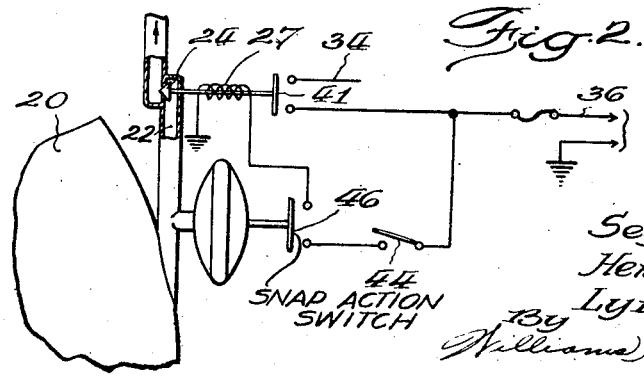
Inventors:
Seymour E. Heymann
Henry J. DeN. McCollum
Lynn A. Williams Jr.
By Williams, Bradbury & Hinkle
Attys.

Patented Sept. 5, 1944

2,357,404

UNITED STATES PATENT OFFICE 2,357,404

AIRCRAFT HEATING SYSTEM

Seymour E. Heymann, Hollywood, Calif., and Henry J. De N. McCollum, Chicago, and Lynn A. Williams, Jr., Northbrook, Ill.; said Heymann and said Williams assignors to Stewart-Warner Corporation, Chicago, Ill., a corporation of Virginia Application December 19, 1941, Serial No. 423,620

4 Claims. (Cl. 158—42.1)

Our invention relates generally to aircraft heating systems, and more particularly to improvements in the controls therefor.

In aircraft heating systems employing internal combustion type heater units which are supplied with a fuel mixture under pressure, the pressure of the mixture source occasionally drops below that necessary to maintain a sufficient supply of fuel mixture at the heaters to support combustion. The heater units have electrical resistance wire igniters which draw considerable current and are provided with thermostatic switches to cause their energization upon extinguishment of the flame for any appreciable length of time. Thus, under the conditions named, if the interruption in the supply of the fuel mixture to the heaters is sustained for any considerable length of time, the heaters will cool and their igniters will be energized throughout such period of interruption, constituting a heavy load upon the electrical generating system of the aircraft.

It is the primary object of our invention to provide means for eliminating the possibility of placing such heavy loads upon the electrical generating system.

A further object of our invention is to provide an improved electrical control circuit for aircraft heating systems employing a plurality of heater units.

A further object is to provide an improved control system for multi-unit aircraft heating systems.

Other objects will appear from the following description, reference being had to the accompanying drawing, in which:

Fig. 1 is a schematic illustration of a representative heating system including a wiring diagram of the control circuits therefor, and Fig. 2 is a wiring diagram of a modified form of control circuit.

The control system of this application may be utilized in conjunction with the aircraft heating systems disclosed in the co-pending applications of Henry J. DeN. McCollum, Serial No. 373,751, filed January 9, 1941, Serial No. 377,181, filed February 3, 1941, or Serial No. 377,182, also filed February 3, 1941.

The control system is particularly useful in systems consisting of a plurality of internal combustion type heater units, although it has many advantages when used in a system employing but a single heating unit of this type.

The heating system illustrated is shown as comprising three heater units 10, 12, and 14, as representative of any desired number of units required in a particular installation. Each of these units is shown as including a conduit 16, through which the combustible mixture is supplied to the unit, and a discharge conduit 18, through which the products of combustion from the heater are exhausted directly to the atmosphere, preferably at a point where the pressure is relatively low while the plane is in flight.

In the system illustrated, an engine supercharger 20 is diagrammatically represented as the source of combustible mixture, supplying the fuel mixture under pressure to a conduit 22, the flow through which is controlled by a valve 24 opened by energization of a solenoid winding 26, and closed by the pressure of the mixture or by a spring. The conduit 22 terminates in a header 28 (shown to an enlarged scale), into which the ends of the conduits 16 project.

The combustible mixture supplied to the heater units 10, 12, and 14, is ignited therein by an electrically operated resistance wire igniter 30, one terminal of which is connected to ground and the other terminal of which is connected to a thermostatic bimetal switch 32, which is closed when cold and opens when the heater associated therewith approaches its normal operating temperature. Although the switches 32 are illustrated as of the simple bimetal type, in practice they are preferably snap switches, of the "microswitch" type, mechanically actuated by thermostatic bimetals.

The switches 32 for the three heater units are connected to a conductor 34, which is adapted to be connected to the live wire of a pair of supply conductors 36, 38, upon closure of a switch 40 forming part of a relay having a winding 42. The winding 42 is in series with a manually operable "on" and "off" switch 44, and a pressure responsive switch 46, which is illustrated as operable by a diaphragm type actuator connected to be responsive to the pressure in the conduit 22 relative to the surrounding atmosphere.

The switch 46 is preferably of the snap-acting type requiring a higher pressure in the conduit 22 to cause its closure than is required to cause it to open. Thus, undesirable oscillation or "hunting" of the system, resulting from changes in pressure in the conduit 22 upon opening and closing of the valve 24, is prevented. Other means and methods may be employed to prevent such "hunting" or oscillation, as for example, by connecting the pressure responsive switch mechanism to a Pitot or impact tube in the conduit 22, so that the switch mechanism will be affected by the kinetic as well as the static pressure in the conduit 22, or by connecting the switch mechanism to the blower casing at a point at which the pressure is not affected by the opening and closing of the valve 24.

Each of the unit heaters 10, 12, and 14 is also provided with a motor 48 driving a fan 50 for circulating air to be heated over the heating units. These motors 48 are connected between the conductor 34 and the return ground, to which the conductor 38 is likewise connected.

Under ordinary operating conditions of the airplane, the heating system is rendered operative by closing the switch 44. Since the switch 46 is normally closed when the airplane is in operation, the relay winding 42 will be energized to close its switch 40. Closure of the switch 40 will result in energization of the solenoid winding 26 to open the valve 24, whereupon, the combustible mixture from the supercharger 20 will be forced through the conduit 22 and header 28 into the various distributing conduits 16 to the heater units. Under these circumstances, the thermostatic switches 32 will be closed, and the igniters 30 will therefore be energized and will be rapidly heated to incandescence and ignite the fuel mixture. Closure of the relay switch 40 will also result in energization of the fan motors 48.

After the heater units have been burning for a short period, their thermostatic switches 32 will open to deenergize their electrical igniters 30.

If for any reason the pressure of the fuel mixture supplied by the supercharger 20 should drop below that necessary to maintain flow of the mixture at a proper rate to the various heater units (a pressure difference of approximately 2" Hg), the pressure responsive switch 46 will be opened, thereby deenergizing the relay winding 42 and allowing the switch 40 to open. Opening of the switch 40 will result in deenergizing the solenoid winding 26, whereupon the valve 24 will close, cutting off further supply of the fuel mixture to the heater units. Likewise, the fan motors 48 will be deenergized, and even though the heater units cool sufficiently to permit their thermostatic switches 32 to reclose, the igniters 30 will not be reenergized. As a result, when the pressure of the fuel mixture supply is insufficient, the igniters will not constitute a load upon the electrical generating system of the aircraft. However, as soon as the supercharger pressure again attains a value sufficient adequately to supply the heater units, the pressure responsive switch 46 will again be closed, thereby again energizing the relay winding 42 with resultant closing of the switch 40, opening of the valve 24, and reenergization of the fan motors 48 and electrical igniters 30.

In the event that the pilot neglects to open the switch 44 upon landing the airplane and cutting off the motor, the electrical controls will immediately deenergize the electrical circuits of the system, since, under these circumstances, the pressure in the conduit 22 will drop and the switch 46 will open to deenergize the relay 42 and open switch 40. Thus, during the intervals that the airplane engine is not in operation, the heating system cannot place any load upon the source of electrical energy for the airplane.

The modified form of the invention shown in Fig. 2 is similar to that of Fig. 1, except that the functions of the relay winding 42 and the solenoid winding 26 of Fig. 1 have been combined in a single solenoid winding 27, the plunger of which operates not only to open the valve 24, but also to close a switch 41, which is adapted to connect conductor 34 with conductor 36. The manually operated switch 44 is adapted to connect the conductor 36 with one terminal of the pressure responsive switch 46, the other terminal of this switch being connected to the ungrounded terminal of the solenoid winding 27. In some installations, in which the control system may be compactly located, the circuit arrangement of Fig. 2 may be preferred over that shown in Fig. 1.

The control circuit of Fig. 2 operates in substantially the same manner as that shown in Fig. 1. Upon closure of the switch 44, a circuit through the solenoid winding 27 will be completed provided that the pressure operated switch is closed due to the presence of adequate pressure of the fuel mixture supplied through conduit 22. Energization of the solenoid 27 will result in opening the valve 24 and closing switch 41. Closure of the switch 41 will result in energization of the fan motors 48 and igniters 30, provided, of course, that their associated heaters have cooled sufficiently to cause closure of their temperature responsive switches 32.

Upon a drop in pressure in the conduit 22 to a value such that the heater units will not be supplied with sufficient combustible mixture to maintain the flames therein, the switch 46 will open, deenergizing solenoid winding 27 and opening switch 41, thus cutting off the supply of current to the heater units.

While we have shown and described particular embodiments of our invention, it will be apparent to those skilled in the art that numerous variations and modifications may be made without departing from the underlying principles of the invention. We therefore desire, by the following claims, to include within the scope of our invention, all such modifications and variations by which substantially the results of our invention may be obtained by the use of substantially the same or equivalent means.

We claim:

1. In an aircraft heating system having an internal combustion type heater provided with an electrical ignition means, means including a supercharger driven by the aircraft engine to supply a combustible mixture under pressure to said heater and to the aircraft engine, said supply means being characterized by the fact that the pressure fluctuates from time to time, a source of electrical energy, a circuit connecting said source with said electrical ignition means for energization of the latter, switch means responsive to the pressure of the combustible mixture supplied by said supply means adapted to open said circuit when the pressure of the mixture drops below a pre-determined minimum value and to close said circuit when the pressure rises above a certain other minimum value, and said switch means being constructed that opening of said circuit will take place at a considerably lower pressure than is required to close said circuit.

2. In an aircraft heating system having an internal combustion type heater provided with an electrical ignition means, means comprising a supercharger driven by the aircraft engine to supply a combustible mixture under pressure to said heater, said supercharger being characterized by the fact that the pressure fluctuates from time to time, a source of electrical energy, a circuit connecting said source with said electrical ignition means for energization of the latter, switch means responsive to the pressure of the combustible mixture supplied by said supply means adapted to open said circuit when the pressure of the mixture drops below a pre-determined minimum value and to close said circuit when the pressure rises above a certain other minimum value, said switch means being constructed that opening of said circuit will take place at a considerably lower pressure than is required to close said circuit, and means responsive to the actuation of said pressure responsive device to interrupt the flow of combustible mixture to said heater substantially simultaneously with the opening of said circuit.

3. In an aircraft heating system, the combination of an internal combustion type heater unit, a supercharger driven by the aircraft engine and therefore forming a source of combustible fuel mixture of variable pressure, a conduit connecting said source with said heater unit, a valve in said conduit, a solenoid for opening said valve, means responsive to the pressure of said source, a switch operated by said last named means, a manually operable switch, a relay winding in series with said manually operated switch and said pressure responsive switch and supplied with electrical energy when both of said switches are closed, a switch operated by said relay winding, a circuit controlled by said last named switch to energize said solenoid, electrical ignition means in said heater unit, and circuit means connecting said ignition means in parallel with said solenoid, the means responsive to the pressure of said source being constructed to open said switch at a substantially lower pressure than is required to close said switch.

4. In an aircraft heating system, an internal combustion heater unit, a supercharger driven by the aircraft engine and therefore comprising a source of combustible fuel mixture of variable pressure, a conduit connecting said source with said heater unit, electrical ignition means associated with said heater unit, a mechanism responsive to the pressure in said conduit, said mechanism including a switch and circuits to deenergize said ignition means and to interrupt the flow through said conduit when the pressure in said conduit falls below a predetermined low value and operable to open said conduit and to energize said ignition means when the pressure in said conduit rises to a predetermined higher value.

SEYMOUR E. HEYMANN.
HENRY J. De N. McCOLLUM.
LYNN A. WILLIAMS, Jr.